United States Patent
Chen (10) Patent No.: US 10,833,772 B1
(45) Date of Patent: Nov. 10, 2020

(54) DEMODULATION-BASED MONO-BIT RECEIVER FOR NYQUIST ZONE DISAMBIGUATION

(71) Applicant: Rockwell Collins, Inc., Cedar Rapids, IA (US)

(72) Inventor: Wenlu Chen, Clarksville, MD (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/688,809

(22) Filed: Nov. 19, 2019

(51) Int. Cl.
| | |
|---|---|
| *H04B 10/67* | (2013.01) |
| *G02F 7/00* | (2006.01) |
| *H04B 10/524* | (2013.01) |
| *H04W 16/14* | (2009.01) |
| *H04L 7/00* | (2006.01) |
| *G02B 1/00* | (2006.01) |

(52) U.S. Cl.
CPC ........... *H04B 10/676* (2013.01); *G02B 1/005* (2013.01); *G02F 7/00* (2013.01); *H04B 10/524* (2013.01); *H04L 7/0075* (2013.01); *H04W 16/14* (2013.01); *H04B 2210/006* (2013.01)

(58) Field of Classification Search
None
See application file for complete search history.

(56) References Cited

U.S. PATENT DOCUMENTS

| | | | |
|---|---|---|---|
| 5,793,323 A | 8/1998 | Tsui | |
| 6,326,912 B1 | 12/2001 | Fujimori | |
| 6,339,621 B1 | 1/2002 | Cojocaru et al. | |
| 6,373,418 B1 * | 4/2002 | Abbey | H03M 7/3022 341/143 |
| 6,448,921 B1 | 9/2002 | Tsui et al. | |
| 8,138,969 B2 | 3/2012 | Huggett et al. | |

(Continued)

FOREIGN PATENT DOCUMENTS

EP        0903863 A1    3/1999

OTHER PUBLICATIONS

Fudge, Gerald et al., "A Nyquist folding analog-to-information receiver", Conference Paper in Circuits, Systems and Computers, 1977, Conference Record, 1977 11th Asilomar Conference on Nov. 2008, https://www.researchgate.net/publication/224505492, 6 pages.

(Continued)

*Primary Examiner* — Rhonda S Peace
(74) *Attorney, Agent, or Firm* — Suiter Swantz pc llo (57) ABSTRACT

A system for Nyquist zone disambiguation of a received broadband RF signal is disclosed. The system includes continuous-wave (CW) and pulsed photonic sources whose outputs may be combined into a single input. Both CW and pulsed components of the combined photonic input are modulated by sampling the received RF input signal. The system includes hybrid couplers for IQ demodulation of the modulated combined photonic signal. The system demultiplexes the demodulated inphase and quadrature differential photonic signals into their CW and pulsed component signals. The pulsed component signals may be digitized by narrowband multibit analog-digital converters (ADC) while the CW component signals are digitized by high speed low latency mono-bit ADCs to determine frequency components (e.g., bandwidth information) and other spectrum information of the RF input signal.

15 Claims, 5 Drawing Sheets

(56) References Cited

U.S. PATENT DOCUMENTS

| | | |
|---|---|---|
| 8,779,955 B1 | 7/2014 | Zanoni et al. |
| 8,953,950 B2 | 2/2015 | Nazarathy et al. |
| 9,467,223 B2 * | 10/2016 | McKinney ........... H04B 10/079 |
| 10,069,619 B1 | 9/2018 | Zanoni et al. |
| 10,355,785 B2 * | 7/2019 | Schermer ............. H04B 10/524 |

OTHER PUBLICATIONS

Ho, Francis, "Using High-Speed Latched Comparators for Simultaneous Instant Frequency Measurement", Electronic Design, https://www.electronicdesign.com/print/30593, Apr. 23, 2009, 6 pages.

Maleh, Ray et al., "Analog-to-information and the Nyquist Folding Receiver", IEEE Journal on Emerging and Selected Topics in Circuits and Systems, vol. 2, Issue 3, Sep. 2012, https://ieeexplore.ieee.org/abstract/document/6355638, 2 pages.

Schermer, Ross T. et al., "Non-Uniform Sub-Nyquist Optical Sampling by Acousto-Optic Delay Modulation", Journal of Lightwave Technology, vol. 36, No. 21, Nov. 1, 2018, pp. 5058-5066.

\* cited by examiner

314 — Generating one or more of an inphase differential photonic signal and a quadrature differential photonic signal by demodulating the combined photonic signal and the second combined photonic input 316 — Demultiplexing each of the inphase differential photonic signal and the quadrature differential photonic signal into a CW component signal and a pulsed component signal 318 — Extracting monobit zone information corresponding to the RF input signal by sampling the CW component signals via at least one monobit analog-digital converter (ADC)

320 — Extracting multibit RF spectrum information corresponding to the RF input signal by sampling the pulsed component signals via at least one multibit ADC 322 — Determining spectrum information corresponding to the RF input signal based on at least one of the monobit zone information and the multibit RF spectrum information

FIG. 4B

DEMODULATION-BASED MONO-BIT RECEIVER FOR NYQUIST ZONE DISAMBIGUATION

TECHNICAL FIELD

The subject matter disclosed herein is directed generally to communications systems and more particularly to photonics-based signal receiver systems.

BACKGROUND

The recovery of broadband radio frequency (RF) signal information via analog-digital converters (ADC) may be complex and challenging. Conventional approaches may, for example, "fold" broadband RF input via pulsed sub-Nyquist rate sampling and narrowband digitization. In other words, when sampled at a frequency lower than twice the input bandwidth, input frequencies alias, or fold, to a narrower intermediate frequency (IF) range (e.g., Nyquist zone). However, the pulsed-laser sources required for this approach can be expensive, and require similarly expensive optical clocks.

SUMMARY

A system for Nyquist zone disambiguation of a received radio frequency (RF) signal is disclosed. In embodiments, the system includes, at the initial end of an optical path, both pulsed and continuous-wave photonic sources capable of generating pulsed and continuous-wave photonic (e.g., laser) inputs of differing wavelengths. The pulsed and continuous-wave photonic inputs are multiplexed into a combined photonic input. The system includes a beam splitter for duplicating the combined photonic input (e.g., into a combined photonic input and an identical coherent reference). The system includes a phase modulator capable of modulating the combined photonic input according to the received RF signal (e.g., received via antenna elements in communication with the modulator). The system includes hybrid couplers configured to generate via I/Q demodulation, based on the modulated photonic signal and the original combined reference, inphase (I) and quadrature (Q) differential photonic signals. The system includes demultiplexers capable of demultiplexing the I and Q differential photonic signals into their continuous-wave and pulsed components. The system includes, at the terminal end of the optical path, multibit analog-digital converters (ADC) for subsampling the pulsed photonic signal components to extract multibit RF spectrum information. Similarly, the system includes mono-bit ADCs for high-speed low-resolution sampling of the continuous-wave signal components to extract mono-bit zone information.

A method for Nyquist zone disambiguation is also disclosed. In embodiments, the method includes generating, via photonic sources, a continuous-wave (CW) photonic input and a pulsed photonic input of different wavelengths. The method includes multiplexing the CW and pulsed photonic inputs into a combined photonic input. The method includes splitting the combined photonic input into two identical photonic inputs (e.g., one photonic input serving as a coherent reference). The method includes receiving a radio frequency (RF) input signal via antenna elements. The method includes generating a combined photonic signal by modulating the combined photonic input according to the received RF input signal. The method includes generating inphase (I) and quadrature (Q) differential photonic signals (e.g., 90° out of phase with each other) via I/Q demodulation of the combined photonic signal and the coherent reference. The method includes demultiplexing the I and Q differential photonic signals into their CW and pulsed component signals. The method includes extracting mono-bit zone information of the RF input signal via sampling of the CW component signals by mono-bit analog-digital converters (ADC). The method includes extracting multibit RF spectrum information of the RF input signal via subsampling of the pulsed component signals by multibit ADCs.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Figure 1:
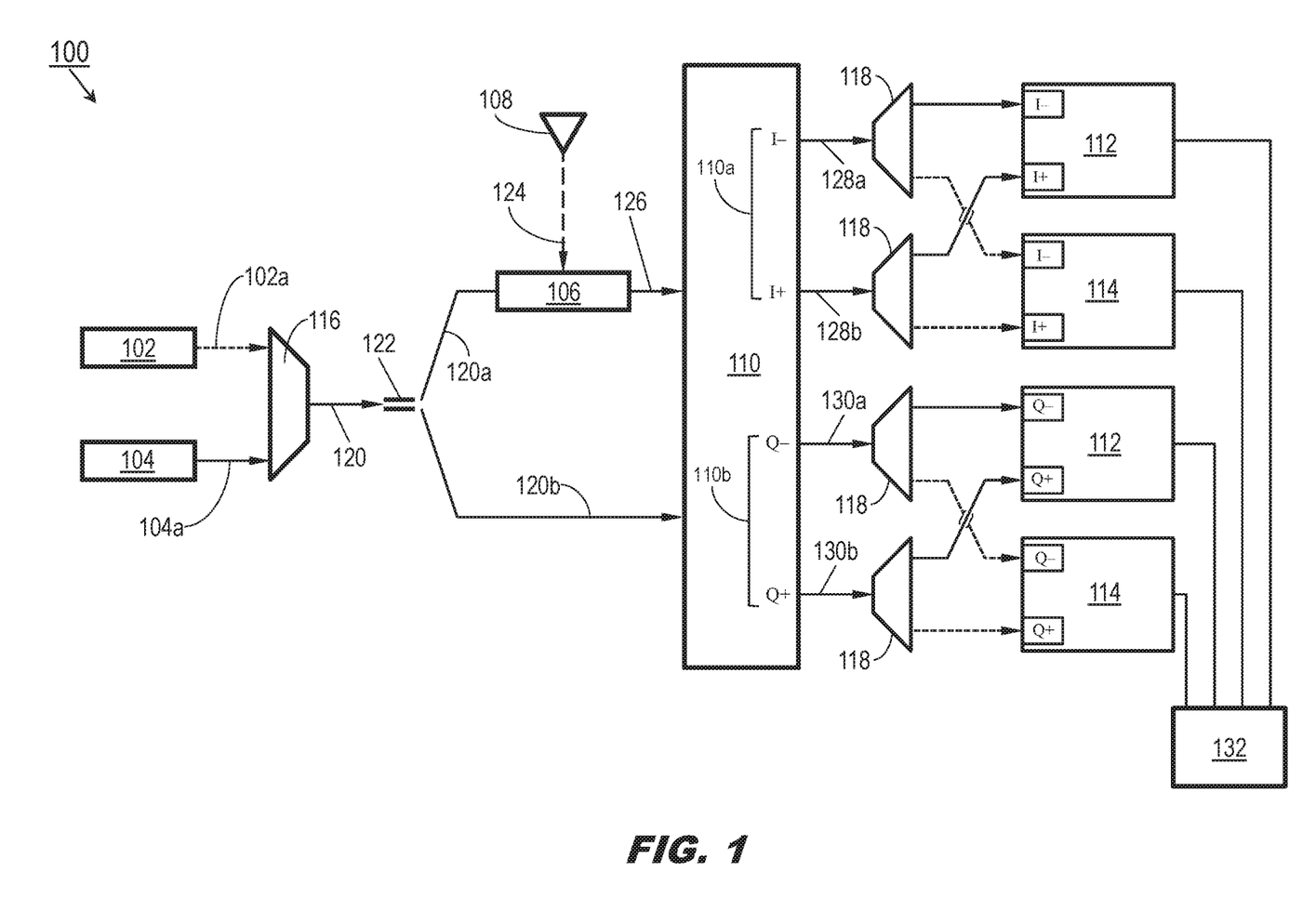
FIG. 1 is a block diagram illustrating a system for Nyquist zone disambiguation of broadband RF input in accordance with example embodiments of this disclosure.

Referring to FIG. 1, a receiver incorporating a system 100 for Nyquist zone disambiguation of broadband radio frequency (RF) input is disclosed. The receiver may include, in addition to a pulsed photonic source 102, a continuous-wave (CW) photonic source 104; an electro-optical phase modulator 106 in communication with RF antenna elements 108; hybrid couplers 110; mono-bit analog-digital converters 112 (ADC); and multibit ADCs 114. In embodiments, the system 100 may be embodied on a single integrated circuit or system-on-chip (SoC).

In embodiments, the pulsed photonic source 102 and CW photonic source 104 at the initial end of the optical path (e.g., incorporating optical fibers or any other appropriate optical transmission media) may be laser emitters or any other appropriate optical beam source. For example, the CW photonic source 104 is far less expensive and requires only electronic timing, rather than the optical timing required for the pulsed photonic source.

In embodiments, the CW laser (104a) generated by the CW photonic source 104 and the pulsed laser (102a) generated by the pulsed photonic source 102 may have different operating wavelengths, allowing for relatively easy multiplexing (muxing) and demultiplexing (demuxing), e.g., via optical multiplexer 116 and optical demultiplexers 118. For example, the optical multiplexer 116 may be a coarse arrayed waveguide grating (AWG) or similarly wavelength division multiplexer capable of combining the CW laser 104a and pulsed laser 102a into a combined photonic input 120.

In embodiments, the system 100 includes a beam splitter 122 for duplicating the combined photonic input 120, e.g., splitting the combined photonic input into two equivalent combined photonic inputs 120a-b. While the combined photonic input 120b serves as a coherent reference, the combined photonic input 120a may be sent through the phase modulator 106, which modulates both components of the combined photonic input (e.g., CW/pulsed) by sampling the broadband input RF signal 124 received via the antenna elements 108, resulting in a modulated combined photonic signal 126.

In embodiments, the hybrid couplers 110 (e.g., four-port hybrid couplers having a 90° phase shift between the two output ports 110a-b) may receive the modulated combined photonic signal 126 and coherent reference 120b and perform I/Q demodulation, outputting an inphase differential photonic signal having negative trace 128a (I–) and positive trace 128b (I+) and a quadrature differential photonic signal (e.g., 90° out of phase from the inphase differential photonic signal 128a-b) having negative trace 130a (Q–) and positive trace 130b (Q+). As with the phase modulator 106, the hybrid couplers 110 may be simultaneously shared by the CW and pulsed photonic components.

In embodiments, the inphase differential photonic signal 128a-b and quadrature differential photonic signal may each be demultiplexed (118) into their respective pulsed and continuous-wave photonic signal components. The pulsed photonic signal components of the inphase (e.g., I–/I+) differential photonic signal 128a-b and the quadrature (e.g., Q–/Q+) differential photonic signal 130a-b may be digitized by high-resolution multibit ADCs 114. For example, the multibit ADCs 114 may be 10-bit, relatively narrowband ADCs (as the inclusion of the CW photonic source 102 alleviates the need for broadband high-speed/high-resolution ADCs) capable of performing high-speed sub-Nyquist sampling (e.g., at a frequency $F_S$ less than twice the input bandwidth, such that the input frequencies fold into the narrower IF range of bandwidth $F_S/2$).

In embodiments, in order to identify a frequency band (e.g., baseband or higher-bandwidth) associated with the RF input signal 124, the CW photonic signal components of the inphase (e.g., I–/I+) differential photonic signal 128a-b and the quadrature (e.g., Q–/Q+) differential photonic signal 130a-b may be digitized by broadband low-resolution spectrum-sensing ADCs, e.g., mono-bit ADCs 112 capable of performing full Nyquist sampling. In some embodiments, the mono-bit ADCs 112 may include comparators (as a mono-bit binary output, e.g., 0/1, may be sufficient), flash ADCs, or other similar types of high-speed, low-latency ADCs.

In embodiments, the system 100 may include additional digital signal processors 132 (DSP) for processing the zone information determined by the mono-bit ADCs 112 and multibit ADCs 114 to determine spectrum information of the broadband RF input signal 124. For example, the DSP 132 may incorporate low-cost fast Fourier transform (FFT) encoding in the frequency domain, such that for an RF input signal $X_k$:

$$X_k = \sum_{n=0}^{N-1} x_n e^{-\frac{i2\pi kn}{N}}, k = 0, 1, \ldots N-1$$

$x_n \in \{1, -1\}$; e.g., only a sum operation and sign flip are required. Similarly, high speed RF output may be determined in the time domain via arctangent (ATAN) decoding of the mono-bit zone information. For example, with respect to both the mono-bit and multibit RF spectrum information:

$$V_{rf} \propto \mathrm{atan}(I_{mono\text{-}bit}/Q_{mono\text{-}bit}); V_{rf} \propto \mathrm{atan}(I_{multibit}/Q_{multibit})$$

for RF input signal voltage V.
Further, for $x_n = \mathrm{atan}(i_n/q_n)$ where $i_n, q_n \in \{1, -1\}$, then:

$$x_n = \in \{1, -1, 3, -3\} \cdot \frac{\pi}{4}.$$

In embodiments, the above FFT equations may similarly apply to I/Q demodulated data after ATAN decoding. In some embodiments, for four frequency components $x_n$, a first frequency component may be determined via FFT while the subsequent three frequency components may be derived therefrom, e.g., retrieved from a lookup table.

Referring generally to FIGS. 2A through 3B, examples of the performance of the system 100 are shown. In embodiments, the signal/noise ratio (SNR) associated with spectrum sensing via the mono-bit ADC (112, FIG. 1) may be improved significantly (e.g., from 10 dB to 20 dB) by incorporating I/Q demodulation via the hybrid couplers (110, FIG. 1).

Figure 2A:
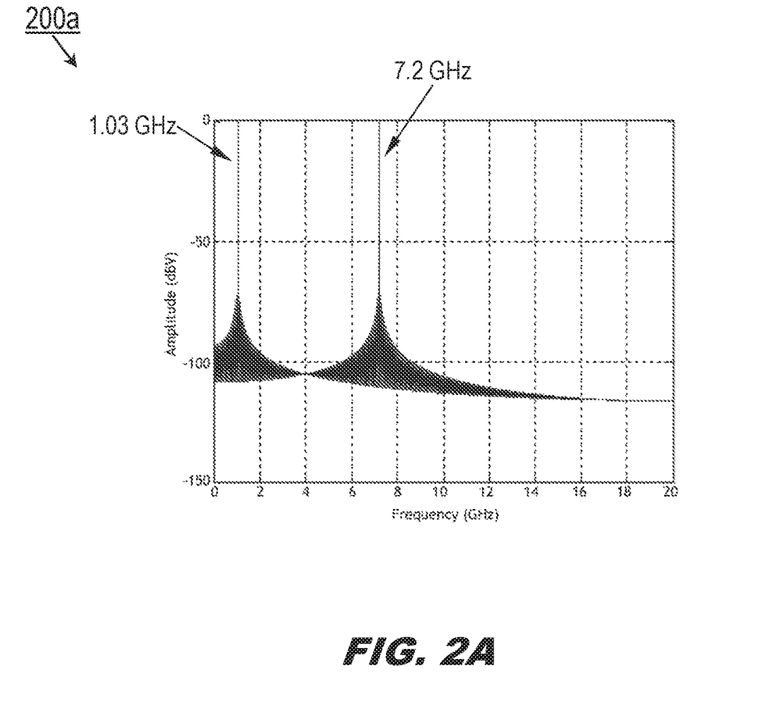
FIGS. 2A-B and 3A-B illustrate performance of the system of FIG. 1.
Figure 2B:
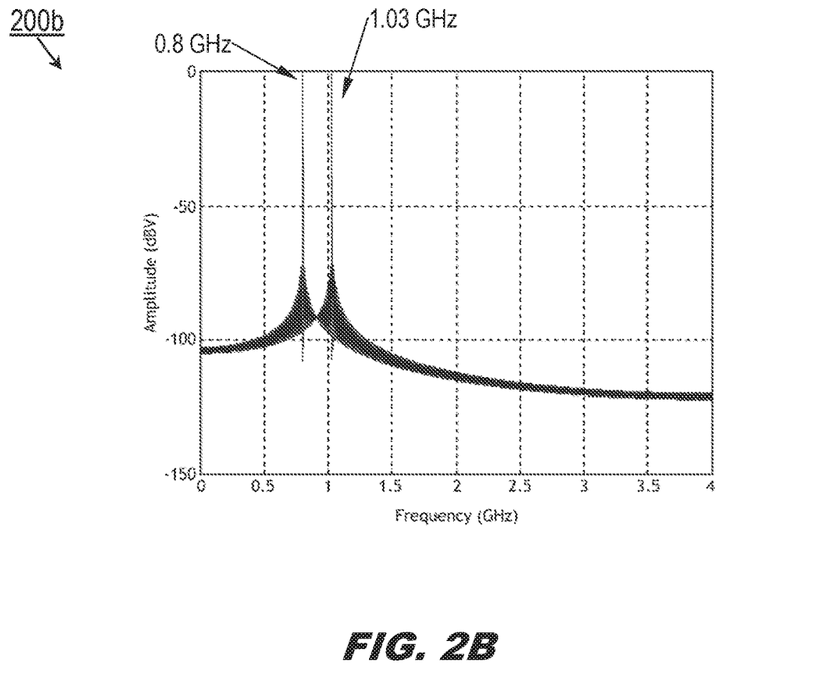
Figure 3A:
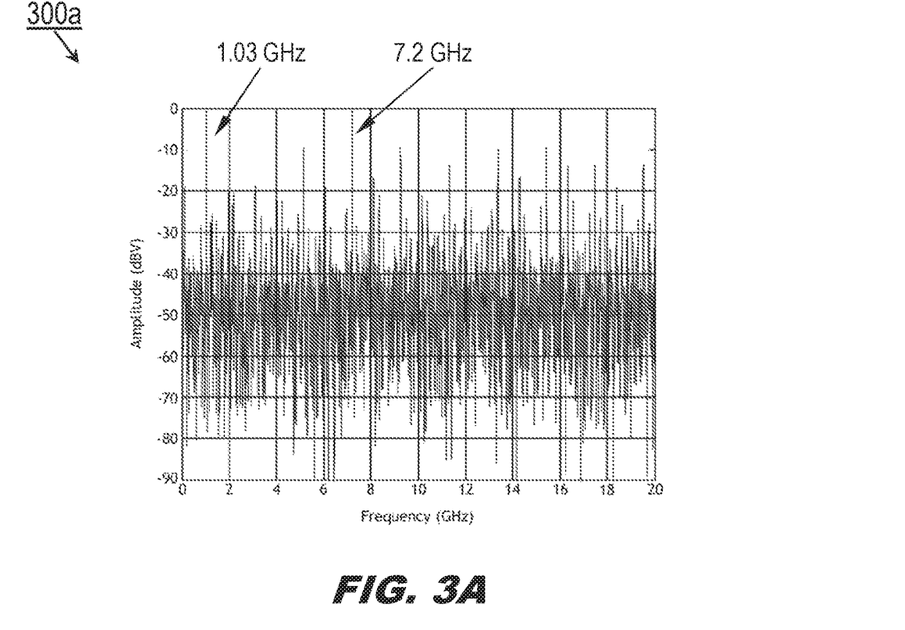
Figure 3B:
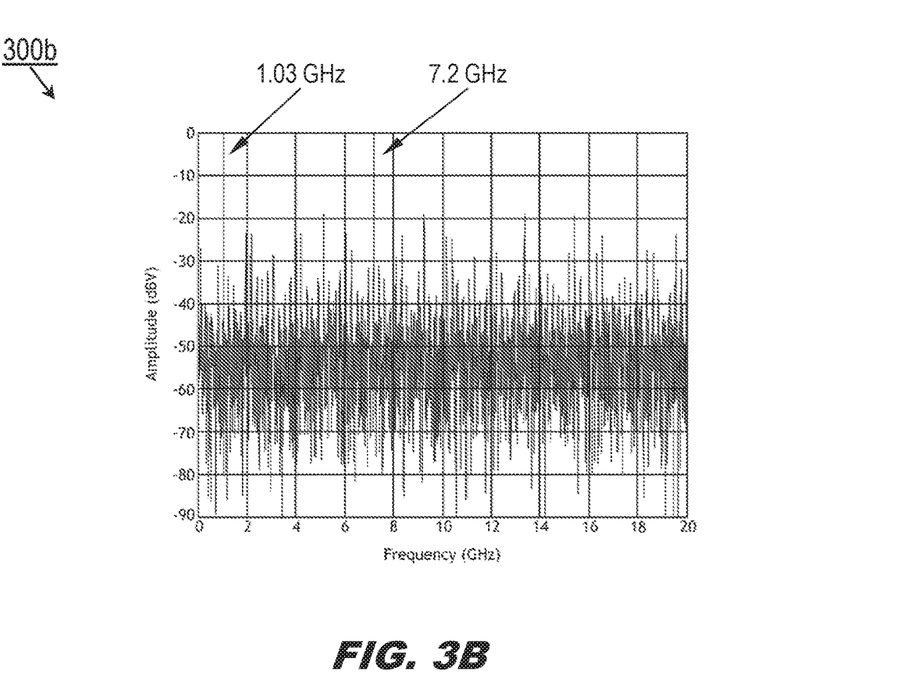

For example, referring in particular to FIGS. 2A and 2B, two-tone performance (e.g., at 1.03 GHz and 7.2 GHz) is shown at a full-spectrum sampling rate of 40 gigasamples per second (Gsa/s; 200a, FIG. 2A), and subsampling at 8 Gsa/s (200b, FIG. 2B). Referring also to FIGS. 3A and 3B, the inphase (I) channel (300a, FIG. 3A) and IQ channel after ATAN decoding (300b, FIG. 3B) clearly indicate the 1.03 GHz and 7.2 GHz frequencies.

Figure 4A:
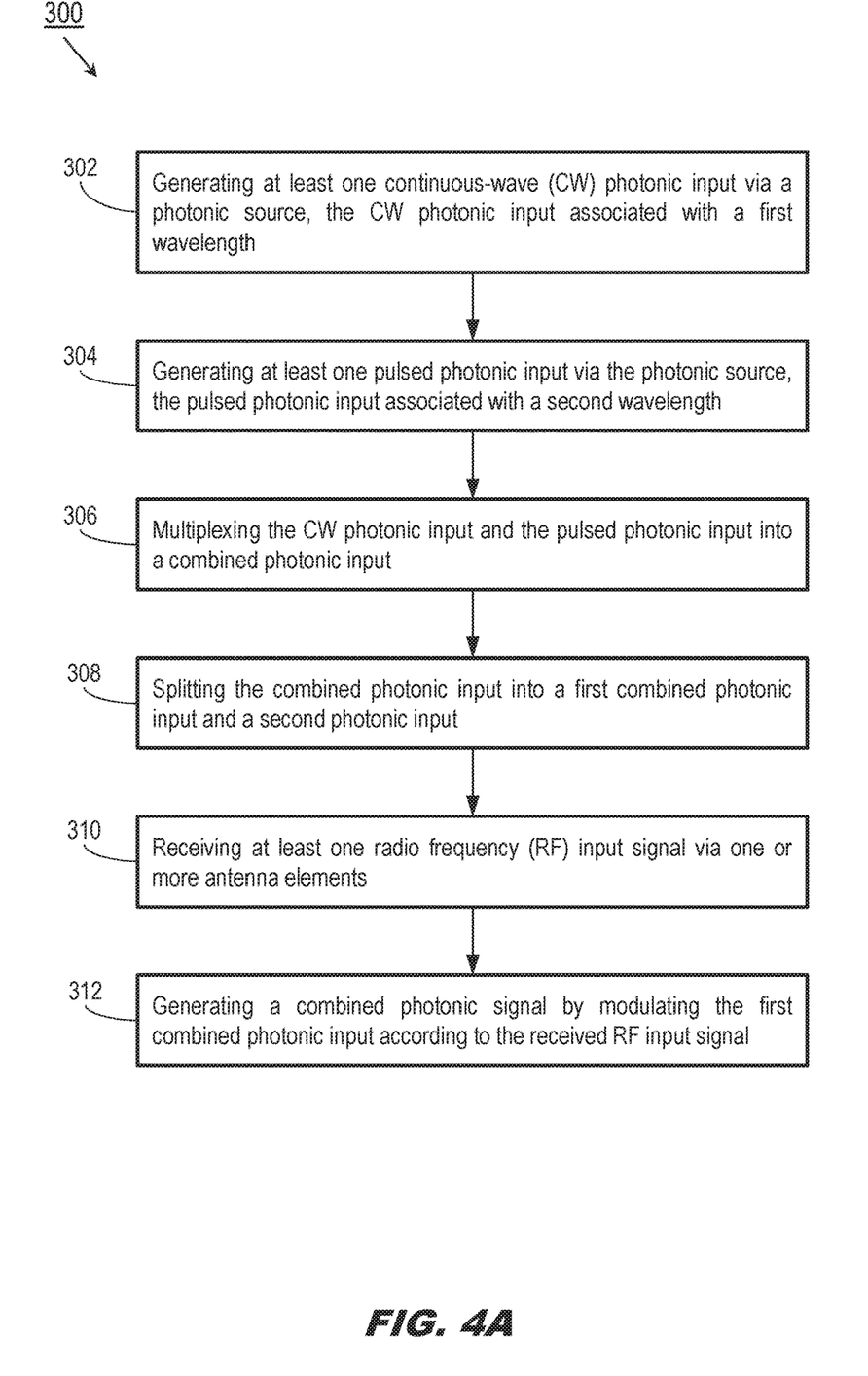
FIGS. 4A-B are process flow diagrams illustrating a method for Nyquist zone disambiguation in accordance with example embodiments of this disclosure.
Figure 4B:
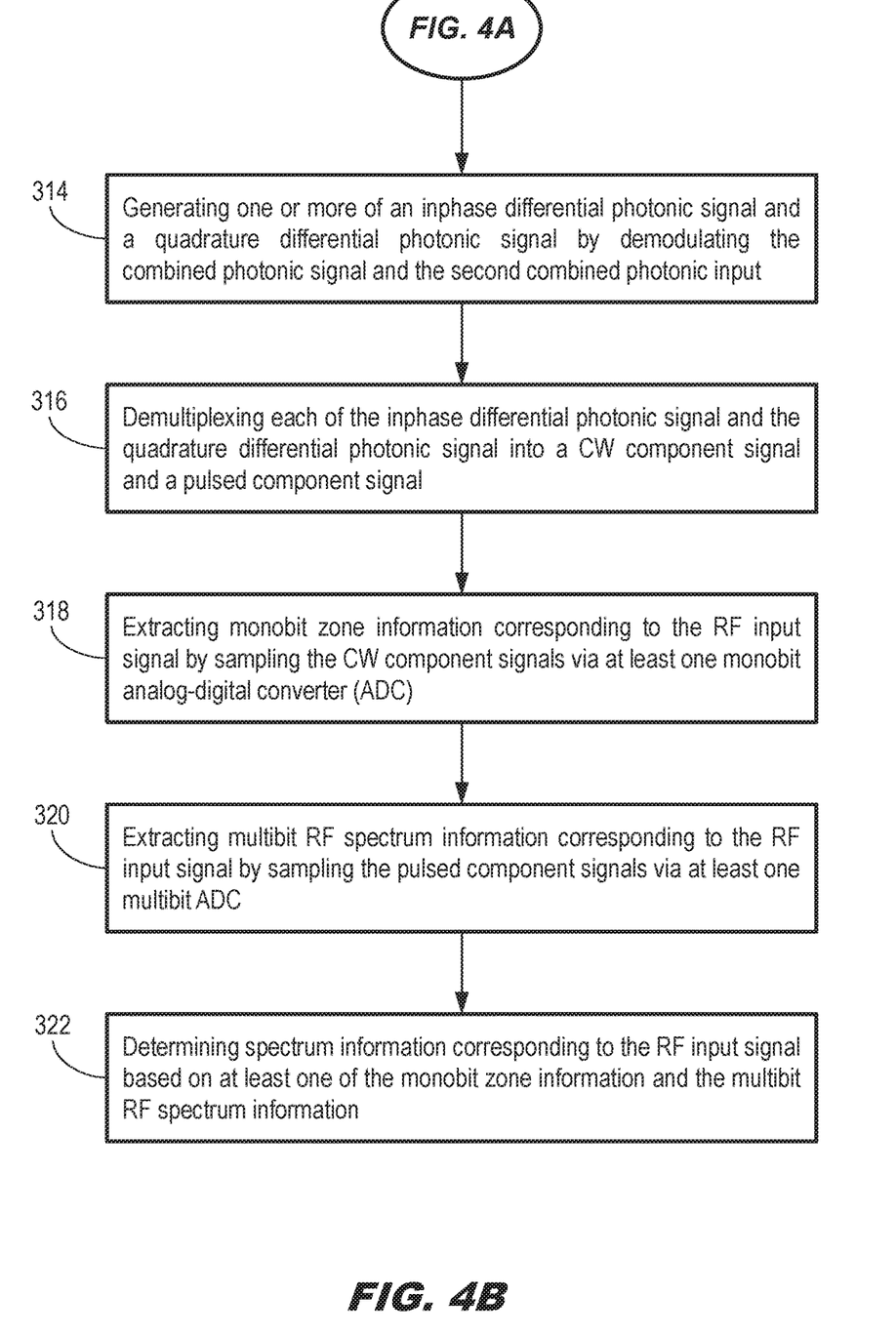

Referring now to FIGS. 4A and 4B, a method 300 may be implemented by embodiments of the system 100 of FIG. 1 and may include the following steps.

At a step 302, referring in particular to FIG. 4A, the CW photonic source generates a CW laser or photonic input associated with a first output wavelength.

At a step 304, the pulsed photonic source generates a pulsed photonic input associated with a second output wavelength (e.g., different from the first output wavelength).

At a step 306, the CW and pulsed photonic inputs are multiplexed into a combined photonic input.

At a step 308, the combined photonic input is split into two equivalent (e.g., first and second) combined photonic inputs.

At a step 310, a broadband RF input signal is received by antenna elements.

At a step 312, an electro-optical phase modulator samples the received RF input signal, modulating both the pulsed and CW components of the combined (e.g., first) photonic input and outputting a combined photonic signal.

At a step 314, referring now to FIG. 3B, the combined photonic signal and coherent reference (e.g., a duplicate of the original combined photonic input) undergo IQ demodulation by hybrid couplers, resulting in an inphase differential photonic signal and a quadrature differential photonic signal.

At a step 316, the inphase differential photonic signal and quadrature differential photonic signal are demultiplexed into their pulsed and continuous-wave component signals.

At a step 318, mono-bit zone information of the broadband RF input signal is extracted by sampling the continuous-wave component signals via mono-bit ADCs. For example, the mono-bit ADCs may be configured for full Nyquist zone spectrum sensing of the CW component signals, or may include other types of high-speed low latency ADC, e.g., flash ADCs or comparators.

At a step 320, multibit RF spectrum information of the broadband RF signal is extracted by sampling the pulsed component signals via multibit ADCs. For example, the multibit ADCs may be configured for narrowband sub-Nyquist sampling of the pulsed component signals.

In some embodiments, the method 300 may include an additional step 322. At the step 322, digital signal processors determine spectrum information of the broadband RF signal based on the extracted mono-bit and/or multibit RF spectrum information. For example, the digital signal processors may perform arctangent (ATAN) decoding of some or all of the zone information. In some embodiments, frequency components may be retrieved from lookup tables based on a first decoded frequency component. Further, the frequency components may include bandwidth information of the received RF input signal.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A system for Nyquist zone disambiguation of a received signal, comprising:

at least one first photonic source configured to generate a pulsed photonic input associated with a first wavelength;

at least one second photonic source configured to generate a continuous-wave photonic input associated with a second wavelength;

at least one multiplexer optically coupled to the first photonic source and to the second photonic source, the multiplexer configured to combine the pulsed photonic input and the continuous-wave photonic input into a combined photonic input;

at least one beam splitter optically coupled to the combiner, the beam splitter configured to generate a coherent reference equivalent to the combined photonic input;

an electro-optical phase modulator optically coupled to the beam splitter, the phase modulator configured to:
receive a radio frequency (RF) input signal;
and
modulate the combined photonic input according to the RF input signal;

at least one hybrid coupler optically coupled to the phase modulator and to the splitter, the hybrid coupler configured to generate at least one inphase differential photonic signal and at least one quadrature differential photonic signal by demodulating the modulated combined photonic input and the coherent reference;

a plurality of demultiplexers optically coupled to the at least one hybrid coupler, the plurality of demultiplexers comprising:
one or more inphase demultiplexers configured to demultiplex the at least one inphase differential photonic signal into a continuous-wave signal component and a pulsed signal component;
and
one or more quadrature demultiplexers configured to demultiplex the at least one quadrature differential photonic signal into a continuous-wave signal component and a pulsed signal component;

and
a plurality of analog-digital converters (ADC) optically coupled to the plurality of demultiplexers, the plurality of ADC including:
one or more mono-bit ADC, each mono-bit ADC configured to extract mono-bit zone information by sampling the continuous-wave signal components; and
one or more multibit ADC, each multibit ADC configured to extract multibit RF spectrum information by sampling the pulsed signal components.

2. The system of claim 1, further comprising:
at least one antenna element configured to receive the RF input signal.

3. The system of claim 1, further comprising:
at least one digital signal processor (DSP) electronically coupled to the plurality of ADC, the DSP configured to determine spectrum information corresponding to the RF input signal based on at least one of the mono-bit zone information and the multibit RF spectrum information.

4. The system of claim 3, wherein the DSP is configured to determine the spectrum information via arctangent decoding of the mono-bit zone information.

5. The system of claim 4, wherein the spectrum information is first spectrum information, and the DSP is configured to retrieve second spectrum information from a lookup table based on the decoded first spectrum information.

6. The system of claim 1, wherein the one or more mono-bit ADC includes at least one of a flash ADC and a comparator.

7. The system of claim 1, wherein the one or more mono-bit ADC are configured for spectrum sensing of the CW component signals.

8. The system of claim 1, wherein the one or more multibit ADC are configured for sub-Nyquist sampling of the pulsed component signals.

9. A method for Nyquist zone disambiguation, the method comprising:
generating at least one continuous-wave (CW) photonic input via a photonic source, the CW photonic input associated with a first wavelength;
generating at least one pulsed photonic input via the photonic source, the pulsed photonic input associated with a second wavelength;
multiplexing the CW photonic input and the pulsed photonic input into a combined photonic input;
splitting the combined photonic input into a first combined photonic input and a second combined photonic input;
receiving at least one radio frequency (RF) input signal via one or more antenna elements;
generating a combined photonic signal by modulating the first combined photonic input according to the received RF input signal;
generating one or more of an inphase differential photonic signal and a quadrature differential photonic signal by demodulating the combined photonic signal and the second combined photonic input;
demultiplexing each of the inphase differential photonic signal and the quadrature differential photonic signal into a CW component signal and a pulsed component signal;
extracting mono-bit zone information corresponding to the RF input signal by sampling the CW component signals via at least one mono-bit analog-digital converter (ADC);
and
extracting multibit RF spectrum information corresponding to the RF input signal by sampling the pulsed component signals via at least one multibit ADC.

10. The method of claim 9, further comprising:
determining spectrum information corresponding to the RF input signal based on at least one of the mono-bit zone information and the multibit RF spectrum information.

11. The method of claim 10, wherein determining spectrum information corresponding to the RF input signal based on at least one of the mono-bit zone information and the multibit RF spectrum information includes:
determining spectrum information corresponding to the RF input signal based on arctangent decoding of the mono-bit zone information.

12. The method of claim 11, wherein the spectrum information is first spectrum information, further comprising:
retrieving second spectrum information from a lookup table based on the determined first spectrum information.

13. The method of claim 10, wherein determining spectrum information corresponding to the RF input signal based on at least one of the mono-bit zone information and the multibit RF spectrum information includes:
determining bandwidth information of the RF input signal.

14. The method of claim 9, wherein extracting mono-bit zone information corresponding to the RF input signal by sampling the CW component signals via at least one mono-bit analog-digital converter (ADC) includes:
extracting mono-bit zone information corresponding to the RF input signal based on spectrum sensing of the CW component signals via the mono-bit ADC.

15. The method of claim 9, wherein extracting multibit RF spectrum information corresponding to the RF input signal by sampling the pulsed component signals via at least one multibit ADC includes:
extracting multibit RF spectrum information corresponding to the RF input signal via sub-Nyquist sampling of the pulsed component signals via the multibit ADC.

* * * * *